United States Patent
Drummond et al.

(10) Patent No.: US 6,350,500 B1
(45) Date of Patent: Feb. 26, 2002

(54) TUBULAR COMPOSITE CONTAINERS HAVING FOLDED UNSUPPORTED FILM LINERS

(75) Inventors: Mike Drummond, Laurinburg, NC (US); Alan Williams, Camden; Gerald Gainey, Hartsville, both of SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/385,901

(22) Filed: Aug. 30, 1999

(51) Int. Cl.$^7$ .................................................. B65D 3/04
(52) U.S. Cl. ................... 428/35.7; 428/34.2; 428/349; 156/195; 156/554; 206/830; 206/803; 220/62.11; 229/202; 229/203; 229/4.5; 426/128
(58) Field of Search ................ 428/34.2, 35.7; 229/4.5, 202

(56) References Cited

U.S. PATENT DOCUMENTS

| | | |
|---|---|---|
| 2,250,430 A | 7/1941 | Wade |
| 3,002,433 A | 10/1961 | Dunlap |
| 3,228,308 A | 1/1966 | Denenberg |
| 3,400,029 A | 9/1968 | Mesrobian et al. |
| 3,524,779 A | 8/1970 | Masters et al. |
| 3,555,976 A | 1/1971 | Carter et al. |
| 3,623,929 A | 11/1971 | Wannamaker et al. |
| 3,716,435 A | 2/1973 | Jensen et al. |
| 4,091,718 A | 5/1978 | Thornhill |
| 4,300,963 A | 11/1981 | Berg |
| 4,917,660 A | 4/1990 | Spaller, Jr. et al. |
| 4,991,768 A * | 2/1991 | Kondo ............. 229/137 |
| 5,076,440 A | 12/1991 | Drummond |
| 5,084,284 A | 1/1992 | McDilda et al. |
| 5,318,499 A | 6/1994 | Rice et al. |
| 5,425,693 A | 6/1995 | Gardner et al. |
| 5,468,207 A | 11/1995 | Bower et al. |
| 5,556,365 A | 9/1996 | Drummond et al. |
| 5,671,895 A | 9/1997 | Cederholm et al. |
| 6,244,500 B1 * | 6/2001 | Cahill et al. ........... 229/4.5 |

FOREIGN PATENT DOCUMENTS

EP     0 857 567 A2     8/1998

* cited by examiner

Primary Examiner—Harold Pyon
Assistant Examiner—Shalie Manlove
(74) Attorney, Agent, or Firm—Alston & Bird LLP

(57) ABSTRACT

A tubular composite container includes a paperboard body ply wrapped into a tubular shape, and a polymer film liner ply wrapped into a tubular shape and adhered to the inner surface of the body ply. The liner strip includes a heat seal layer facing the body ply that is formed of a heat-sealable material, and the inner surface of the liner ply that contacts the mandrel is formed of a hard polymer material whose melting temperature is substantially higher than the sealing temperature at which the heat-sealable material softens and seals to itself. One edge portion of the liner ply is folded inward toward the mandrel, the liner ply is wrapped onto the mandrel such that the folded edge portion overlaps an opposite edge portion of the liner ply, and the heat seal layer on the folded edge portion is heat sealed to the opposite edge portion.

9 Claims, 2 Drawing Sheets

TUBULAR COMPOSITE CONTAINERS HAVING FOLDED UNSUPPORTED FILM LINERS

FIELD OF THE INVENTION

The present invention relates to methods and apparatus for making tubular composite containers and, more particularly, to methods and apparatus for making such containers by wrapping a liner strip and at least one paperboard strip about an axis and adhering the various strips together.

BACKGROUND OF THE INVENTION

Food and drink products and other perishable items are often packaged in tubular containers that are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and is then fitted with end caps to form the container.

Tubular containers of this type typically include a liner ply on the inner surface of the paperboard body ply. The liner ply prevents liquids such as juice from leaking out of the container and also prevents liquids from entering the container and possibly contaminating the food product contained therein. Preferably, the liner ply is also resistant to the passage of gases, so as to prevent odors of the food product in the container from escaping and to prevent atmospheric air from entering the container and spoiling the food product. Thus, the liner ply provides barrier properties and the body ply provides structural properties.

Conventional liner plies most often include a paper/aluminum foil laminate, which has good barrier properties and also has advantageous strength properties. In particular, the liner is wound onto the mandrel prior to the winding of the body ply and must be sufficiently strong and stiff to be independently wound on the mandrel without stretching or wrinkling. Because of the support provided by the foil layer of the liner, such liners are known as "supported" liners.

As mentioned, the laminate includes an aluminum foil layer and a kraft paper backing for allowing the foil layer to be adhered to the paperboard body ply. Aqueous based adhesives (or "wet adhesives") are preferred for adhering the liner ply to the body ply because solvent-based adhesives have become disfavored in light of various environmental concerns over their use and disposal. However, it has heretofore been difficult to get the aqueous adhesives to stick to the smooth and impervious surface of the aluminum foil layer. Accordingly, a kraft paper backing has been preadhered to the foil layer so that the liner can be adhered to the paperboard body ply with wet adhesives. However, the kraft paper adds further cost and thickness to the liner.

Typically, a liner formed as a paper/foil laminate includes a polymeric layer on the surface of the foil that faces inward toward the interior of the resulting container. The polymeric layer prevents product in the container from coming into contact with the foil layer, which in some cases can cause a reaction that can corrode the foil and discolor or otherwise adulterate the product. The polymer layer is normally a heat-sealable material permitting one edge portion of the liner strip to be heat sealed to an overlying opposite edge portion of the strip. The polymer layer may also improve the abrasion resistance of the foil, and maintains a barrier in the event that tiny pinholes are present in the foil.

In the manufacture of tubular composite containers, a strip of liner material is wrapped about a shaping mandrel and is advanced along the mandrel as the tubular composite container is formed. At the line speeds currently being used in the commercial manufacture of such containers, the liner strip is typically advanced at a linear rate of 400 feet per minute or more and is compressed upon the mandrel by the paperboard strips wrapped on top of the liner and by the belt or other device that advances the tubular container along the mandrel. Consequently, there is considerable friction between the mandrel and the liner, which generates heat. This heat can cause softening of the polymer layer of the liner that is in contact with the mandrel, with the result that the liner tends to adhere to the mandrel and is "scuffed" as it advances along the mandrel.

To help counteract this scuffing tendency, a lubricant is typically applied to the inner surface of the liner. Additionally, in some cases the mandrel is chilled so that the mandrel temperature is kept sufficiently low that the polymer layer of the liner is less prone to softening and sticking to the mandrel. However, where the polymer film layer performs the function of a heat seal layer, a dilemma of sorts is faced wherein a low mandrel temperature is desirable for reducing scuffing and sticking of the liner on the mandrel, while a higher mandrel temperature is desirable for facilitating the activation of the heat-sealable polymer layer to form a seal.

Where a supported liner is used, this dilemma can be largely avoided by heating the liner, or at least the edge portions that are overlapped to form a seal, to a temperature above the sealing temperature for the polymer layer just prior to wrapping the liner about the mandrel. The relatively large mass of the foil and kraft layers of the liner operates as a heat sink which holds the heat long enough that the liner edge portions can be heat sealed to each other when the liner strip is wrapped on the mandrel.

However, foils and krafts are expensive and add thickness, and so it is desired to provide a container and a method of making such as container which includes an "unsupported" polymer liner having the requisite barrier properties without the aluminum foil layer and kraft layer. When an unsupported liner is used, however, the heat sink function of the foil and kraft layers is eliminated. As a consequence, the relatively thin polymer film liner is difficult to heat because of its low mass which tends to dissipate heat rapidly.

The use of unsupported liners also presents other technical challenges. For example, because of the problems associated with winding an unsupported liner on the mandrel, such as stretching, creasing or other misshaping of the liner, it has not been economically or commercially feasible with conventional winding apparatus and methods to manufacture a container having an unsupported liner ply. Nevertheless, in view of the considerable material and cost savings that unsupported liners offer, it would be highly desirable to provide methods and apparatus for making tubular composite containers with unsupported liners.

Unsupported liners also offer advantages in addition to material and cost savings. More particularly, the elimination of the kraft and foil layers results in a considerable reduction in the thickness of the fold seal by which one edge of a liner strip is sealed to an opposite edge of a liner strip. With conventional supported liners, anaconda folds have been necessary to allow one edge of the liner to be sealed to the opposite edge, thus resulting in a continuous sealed liner. In an anaconda fold, the underlying edge of the liner ply is folded back on itself and adhered to the overlying edge. The anaconda fold allows the polymeric layers on the surface of the foil layer to be heat sealed together. Alternatively, a hot melt adhesive can be used to seal the underlying edge of the liner ply to the overlying edge. The edge of the kraft paper thus is not exposed to the interior of the container and thus liquids in the container will not be absorbed by the kraft paper. An example of such a fold is illustrated in U.S. Pat. No. 5,084,284 to McDilda, et al.

The thickness of an anaconda fold seam is equal to three thicknesses of the liner ply. Thus, with relatively thick supported liners, the anaconda fold presents a substantial thickness and poses difficulties when attempting to hermetically seal the ends of the tubular container. Specifically, the ends of the tube are often rolled outwardly after being cut so as to form a rolled circular bead or flange on one or both ends of the tube and then end caps or membranes are applied and usually sealed to the bead with an adhesive sealant, heat sealing, or other technique. However, in the area where the thick anaconda fold seam forms a portion of the edge surface, the end surface of the bead or flange can be substantially non-planar thus forming hill-like and/or valley-like irregularities. Accordingly, an extra amount of adhesive sealant or heat seal material is required in order to fill the discontinuities and hermetically seal the closure member to the tubular container. The additional application of adhesive sealant or heat seal material is disadvantageous because of the extra sealant that must be used and the increased difficulty in removing the seal by the consumer due to the additional sealant. For example, where a membrane includes a heat seal layer, the entire heat seal layer must be made thicker, even though the increased thickness is actually needed only around the periphery of the membrane where it contacts the bead.

Because of the problems noted above with respect to supported liners, efforts have been made toward developing methods and apparatus for making tubular composite containers having unsupported liners in which the foil and kraft layers are eliminated from the liner. Additionally, there have been sought methods and apparatus for making composite containers having liners formed without anaconda fold seams or with greatly reduced anaconda fold thicknesses.

A liner formed entirely of one or more relatively thin polymer layers would be particularly beneficial in that the additional foil and kraft layers would be eliminated along with their attendant costs, and the liner seam would present a relatively slight bump at the curled end of the container so that problems of hermetically sealing closures on the container ends would be substantially reduced. Accordingly, the assignee of the present application has striven toward developing practicable methods and apparatus for making containers with such unsupported film liners. For example, the assignee of the present application has developed methods and apparatus for making composite containers with unsupported liners made of polymer film and without anaconda folds, as disclosed in commonly owned U.S. patent application Ser. No. 08/796,912 entitled "Polymeric Liner Ply for Tubular Containers and Methods and Apparatus for Manufacturing Same" filed Feb. 6, 1997, and U.S. Pat. No. 5,829,669 entitled "Tubular Container and Methods and Apparatus for Manufacturing Same" issued Nov. 3, 1998, the entire disclosures of which are hereby incorporated herein by reference.

The '912 patent application and '669 patent disclose composite container-forming methods and apparatus wherein, according to one embodiment, a polymeric liner strip is adhesively joined to a paperboard body-forming strip prior to being wrapped about a shaping mandrel. By "prelaminating" the polymeric liner strip and paperboard strip together, the liner is effectively structurally supported by the paperboard strip so that it is relatively easily advanced to the mandrel without becoming excessively stretched or otherwise misshapen in the process. The polymeric liner strip is offset relative to the paperboard to which it is adhesively joined such that a marginal edge portion of the liner strip extends beyond one edge of the paperboard strip. The laminated paperboard/polymeric strip is wrapped about the mandrel so that the edges of the paperboard strip overlap each other and the marginal edge portions of the polymeric liner overlap each other. One of the marginal edge portions of the liner strip includes a non-aqueous adhesive layer that is heat activatable. Before and/or while the laminated paperboard/polymeric strip is wrapped about the mandrel, the non-aqueous adhesive layer on the marginal edge portion is heated to at least its activation temperature, and the overlapping edges are heat sealed together. Thus, the resulting composite container has a polymeric liner formed without anaconda fold seams.

However, the apparatus used to laminate the body and liner plies together before wrapping the plies onto the mandrel may not be the most advantageous in some applications. For instance, in some cases a separate set of nip rollers is needed to effect the lamination. Additionally, it will be appreciated that both the liner supply and body ply supply rolls must be located on the same side of the mandrel, which can make the placement of the supply rolls and the routing of the plies to the mandrel more complicated than would otherwise be the case if both the liner and body plies did not have to approach the mandrel from the same side. Replacement of the rolls may also be more difficult where the two supply rolls are located close together as they would tend to be in order to make efficient use of space.

In view of such drawbacks, the assignee of the present application has also developed methods and apparatus for making tubular containers with unsupported film liners enabling either same-side or opposite-side winding of the liner strip onto the mandrel, as described in commonly owned and copending U.S. patent application Ser. No. 09/385,900 entitled "Tubular Composite Containers Having Unsupported Film Liners and Methods and Apparatus for Making Same" filed Aug. 30, 1999, the disclosure of which is incorporated herein by reference. In accordance with the methods and apparatus of the '900 application, a polymer film liner is drawn from a liner supply and through a tension-controlling apparatus that maintains the liner tension low enough to prevent substantial misshaping of the liner strip, and the liner strip is wrapped about the mandrel prior to the paperboard body ply or plies being wrapped onto the mandrel. The inner surface of the liner that contacts the mandrel as the tubular container is advanced along the mandrel comprises a heat-sealable material, and a heat-sealable material also forms at least part of the outer surface of the liner that is adhesively joined to the paperboard body ply by a water-based or "wet" adhesive. One edge of the liner strip overlaps an opposite edge of the liner strip so that the heat-sealable materials on the inner and outer surfaces of the strip are in contact. The portion of the mandrel over which the overlap joint passes is raised to an elevated temperature just below the sealing temperature at which the heat-sealable materials are activated to seal to each other, thus preheating the overlap joint. Additional heat is applied locally by focused infrared and/or forced air heaters so as to raise the temperature of the overlap joint to at least the sealing temperature and thereby seal the overlap joint.

With the method of the '900 application, the heat-sealable material on the inner surface of the liner strip is heated and softened as it passes over the heated portion of the mandrel, and this softening leads to greater friction between the liner strip and the mandrel. To help reduce the friction, a lubricant can be applied to the inner surface of the liner strip, except for the edge portion to be heat sealed, just prior to winding the liner onto the mandrel. The lubricant can cool the heat-sealable material and thereby aid in allowing the edge portion to remain hotter than the remainder of the heat-sealable layer. However, many commonly used lubricants leave a tacky residue on the mandrel that can cause dust to adhere to and accumulate on the mandrel, which is undesirable. Lubricants can also negatively affect the sealing of membranes onto the ends of the container. Additionally, lubricants must be FDA-approved if used for making containers for food products, which limits the types and amounts of lubricants that can be used.

In summary, with liners having a conventional type of anaconda fold seal, a heat-sealable material is required on the inner surface of the liner against the mandrel because the edge of the liner is folded outward to bring the heat-sealable material into opposing relation with the overlying opposite edge of the liner, which also has the heat-sealable material on its inner surface, so that the edges can be heat sealed together. In the case of supported liners having a kraft paper backing, the anaconda fold seal is employed to allow edge-to-edge sealing of the liner so as to form a continuous inner barrier that is resistant to the passage of moisture and/or gases. An alternative type of liner seam is a straight overlap seam in which one edge of the liner overlaps the opposite edge such that the inner surface of the overlying edge contacts the outer surface of the underlying edge, as also described in the '900 patent application. In order to heat seal such straight overlap seams, there must be heat-sealable material on the inner surface of the liner at least along the overlying edge portion, and also on the outer surface of the liner at least along the underlying edge portion. Polymer film liner materials having the heat-sealable material already applied to one or both sides of a base film are typically formed by coextruding the heat-sealable material and the base film material to which it is applied, and generally will have the heat-sealable material applied to the entire surface (or surfaces) of the base film. Thus, the heat-sealable material will typically cover the entire inner surface of the liner, whether it is supported or unsupported. Accordingly, with either outwardly folded fold seals or straight overlap seams, the heat-sealable material on the inner surface of the liner tends to scuff on the mandrel when it is heated to its activation or sealing temperature.

In light of the foregoing, it would be highly desirable to provide methods and apparatus capable of making a composite container with an unsupported polymer film liner. Furthermore, it would be desirable to provide methods and apparatus permitting the formation of such a container without prelaminating the body and liner plies. It would also be desirable to provide methods and apparatus enabling a reduction in liner friction on the mandrel and thus faster line speeds in the production of composite containers having unsupported polymer film liners.

SUMMARY OF THE INVENTION

The above and other objects are met and other advantages are achieved by the present invention, which includes methods and apparatus for making a tubular composite container having a paperboard body strip and an unsupported polymer film liner strip adhered thereto, wherein the liner inner surface is formed of a hard polymer material having a relatively high melting temperature that resists scuffing even at elevated temperatures, and the outer surface is formed of a heat-sealable material having a sealing temperature substantially lower than the melting temperature of the hard polymer material. The liner seam is formed by folding one edge of the liner strip inwardly so that the heat-sealable material on the folded edge faces inward toward the mandrel, wrapping the liner strip about the mandrel such that the folded edge portion overlies an opposite edge portion of the liner strip, and heat sealing the folded edge to the underlying opposite edge portion of the liner strip. Thus, the surface of the liner strip that contacts the mandrel is formed of the hard polymer material, which tends to slip along the mandrel more readily than the heat-sealable material even when the mandrel is heated to promote heat sealing of the overlapping edge portions.

In accordance with the present invention, folding the edge of the liner inward rather than outward enables the heat-sealable material to be eliminated from the inner surface of the liner. This yields several major benefits: First, the provision of the hard polymer material on the inner surface of the liner strip reduces scuffing of the liner strip on the mandrel. Second, relative to a liner having heat-sealable material on both inner and outer surfaces (such as is used in liners having heat-sealed straight overlap seams), the liner thickness is reduced by an amount equal to the thickness of the heat-sealable material eliminated from the inner surface. Third, elimination of the heat-sealable coating on the inner surface of the liner leads to reduced cost for the liner.

In accordance with a preferred embodiment of the invention, at least the overlapping edge portions of the liner strip are heated as they pass over a heated portion of the mandrel such that the heat-sealable material reaches an elevated temperature below its predetermined sealing temperature. By heating a portion of the mandrel over which the liner strip passes, it is possible to heat the liner strip for a greater period of time so that the heat-sealable material has sufficient time to reach the elevated temperature. Additional heat is then applied locally to the overlap joint of the tubular liner at a second heating station located on the mandrel to further raise the temperature of the heat-sealable material to at least the predetermined sealing temperature and cause the edge portions to be sealed together. In this way, the mandrel temperature can be maintained at a relatively lower temperature than would be required were all of the heating for activating the heat-sealable material to be done by heating the mandrel. The provision of the hard polymer layer on the liner inner surface facilitates the use of mandrel heat to assist in the heat sealing operation, because the hard polymer layer tends to slide easily even over the heated portion of the mandrel.

In accordance with another preferred embodiment of the invention, the additional heat for activating the heat-sealable material is applied locally to the overlap joint of the liner by heating a portion of the mandrel surface over which the overlap joint passes to a higher temperature than the elevated-temperature portion of the mandrel. Advantageously, infrared radiation is focused on the overlap joint and penetrates through the liner edge portion such that the mandrel surface underlying the overlap joint is heated to a temperature above the sealing temperature of the heat-sealable material. However, other heating devices can be used in addition to or instead of the infrared radiator, including forced hot air devices directed on the overlap joint, electrical resistance heating elements disposed within the mandrel, or other heating devices known in the heating art.

In order to adhere the liner and paperboard body strips together, an adhesive is applied to a surface of the paperboard body strip that confronts the outer surface of the tubular liner. Advantageously, the surface of the liner strip that forms the outer surface of the tubular liner is treated to improve adhesion of the adhesive thereto. The surface treatment in one preferred embodiment comprises corona discharge treatment. Alternatively, flame treatment may be used.

To further promote adhesion of the liner to the paperboard body, the liner strip in accordance with one embodiment of the invention has an adhesion-promoting coating covering the surface of the heat seal layer that faces the paperboard body. The adhesion-promoting coating does not cover the edge portions, however, such that the heat seal layer remains exposed on the edge portions. Where the liner strip is supplied with the adhesion-promoting coating covering the entire surface of the heat seal layer, the method in accordance with a preferred embodiment of the invention includes the step of removing the coating from the edge portions to expose the heat seal layer prior to folding the one edge portion of the liner strip inward and wrapping the liner strip onto the mandrel. The adhesion-promoting coating can be removed either mechanically or with heat.

Thin polymer films are stretchable, and accordingly it is preferable to control the tension of the polymer film liner strip to maintain the tension low enough that stretching of the liner strip is substantially avoided. Thus, in a preferred embodiment of the invention, the tension of the liner strip is controlled so that it is less than about 1 pound per inch of width of the liner strip, which permits films having thicknesses of as little as 0.0005 inch to be used for the liner strip.

The invention also encompasses tubular containers having unsupported polymer film liners. In accordance with a preferred embodiment of the invention, a tubular container comprises at least one body ply formed of paperboard and wrapped into a tubular shape having an inner surface, and a polymeric liner ply wrapped to form a tubular liner and having an outer surface of the tubular liner adhered to the inner surface of the body ply. The tubular liner includes at least one fold seal extending generally lengthwise along the container, the fold seal being formed by a first edge portion of the liner ply that is folded inward toward the interior of the container and an opposite second edge portion of the liner ply that overlaps the folded first edge portion and is sealed thereto.

In accordance with a further preferred embodiment of the invention, the liner ply includes a heat seal layer that faces the body ply and is formed of a heat-sealable material having a sealing temperature at which the heat-sealable material softens and seals to itself, and wherein the liner ply includes a hard polymer layer that forms the inner surface of the container and is formed of a polymer material having a melting temperature substantially higher than the sealing temperature of the heat seal layer. The hard polymer layer of the liner ply preferably comprises a barrier material that is substantially impervious to moisture and gases, examples of which include but are not limited to metallized OPET and metallized OPP. The heat seal layer preferably comprises polyester, or a blend of polyester and an ethylene vinyl acetate copolymer.

The liner strip in one embodiment includes a coating of an adhesion-promoting material applied to the surface of the heat seal layer facing the body ply for promoting adhesion of the liner ply to the body ply. The adhesion-promoting coating terminates adjacent the edge portions of the liner strip such that the heat seal layer is exposed on the edge portions. With such an unsupported liner, the edge fold method of the present invention is preferable to using a simple lap seal, because such a lap seal may not provide sufficient bond strength between the heat seal material on one side of the film and the non-heat seal material on the other side to tolerate operations such as beading and sealing of the end closures.

Additionally, the folded edge portion of the liner desirably can be adhered to the remainder of the liner with the aid of a hot melt adhesive, an ethylene methyl acrylate, or blends thereof, in order to provide good fold bonding.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF PREFERRED EMBODIMENTS

The invention is now explained by reference to certain preferred embodiments thereof. It will be understood, however, that the invention is not limited to these embodiments but may take other forms within the scope of the appended claims.

Figure 1:
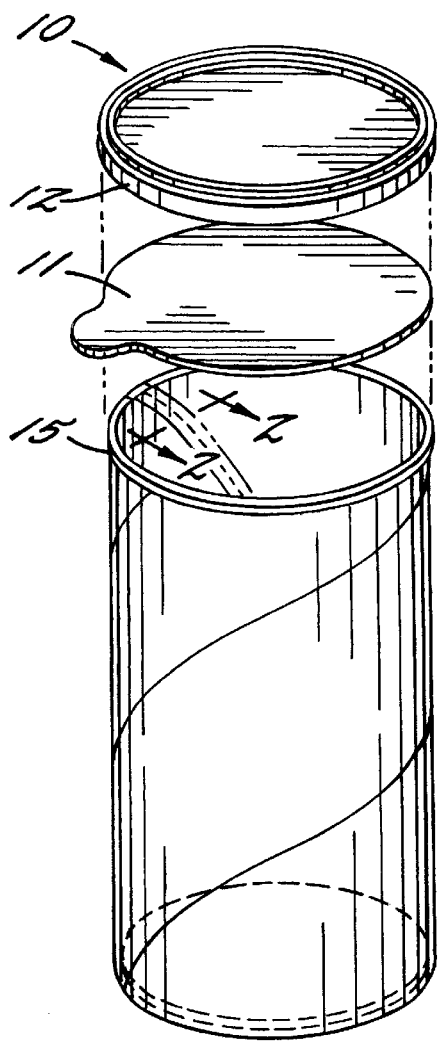
FIG. 1 is a perspective view of a tubular composite container having an unsupported liner in accordance with a preferred embodiment of the invention.
Figure 2:
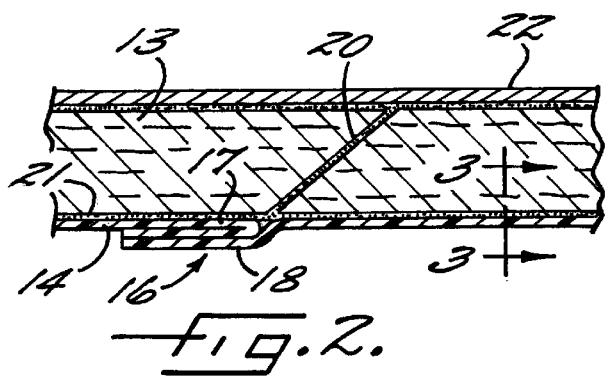
FIG. 2 is a cross-sectional view taken on line 2—2 of FIG. 1 through the liner overlap joint of the container.

With reference to FIGS. 1 and 2, there is shown a composite container 10 having an unsupported liner in accordance with the present invention. Although illustrated as having a circular cross-section, the tubular container 10 may have any cross-sectional shape that can be formed by wrapping the tube around an appropriately shaped mandrel. For example, the tube can be formed in a rectangular shape with rounded corners. The embodiment illustrated in FIG. 1 is particularly advantageous for packaging potato crisps or chips and includes a flexible membrane seal 11 and a reusable plastic end cap 12 over the seal. Various other end closures may be used, however, depending upon the type of product that is to be packaged. For example, where dough is to be packaged, the end caps are typically constructed of metal and are crimp-sealed onto the ends of the container.

As illustrated in more detail in FIG. 2, the tubular container 10 includes a wall having a body ply 13 that is preferably formed of paperboard and a liner ply 14 that is preferably formed of a polymeric material adhered to the inner surface of the body ply 13. The upper end of the tubular container 10 is rolled over so as to form a bead 15 or flange and the membrane seal 11 is hermetically sealed to the top of the bead with a sealant (not shown) that is typically a part of the membrane. The end cap 12 is then snapped over the bead 15 and may be reused after the membrane seal 11 has been removed. A metal closure (not illustrated) can be secured to the opposite end of the container 10.

The seams where the various plies are joined together are illustrated in FIG. 2. The paperboard body ply 13 is made of a relatively thick and stiff paperboard. Accordingly, in some types of containers such as self-opening containers, the edges are first skived and then joined together during the tube forming process with an adhesive 20 to create a strong seam. The liner ply 14 is adhered to the inner surface of the body ply 13 with a wet adhesive 21 and the overlapping edges of the liner ply are adhered together to ensure that the container 10 is completely sealed. A label ply 22 is preferably adhered to the outer surface of the body ply 13 having various graphics and/or indicia printed thereon regarding the product within the container.

The liner ply 14 includes a fold seal 16 formed by overlapping a folded first edge portion 17 of the liner with an opposite second edge portion of the liner and sealing the overlapping edge portions together, as further described below. The folded edge portion 17 is folded inwardly toward the interior of the container, for reasons made apparent below.

Figure 4:
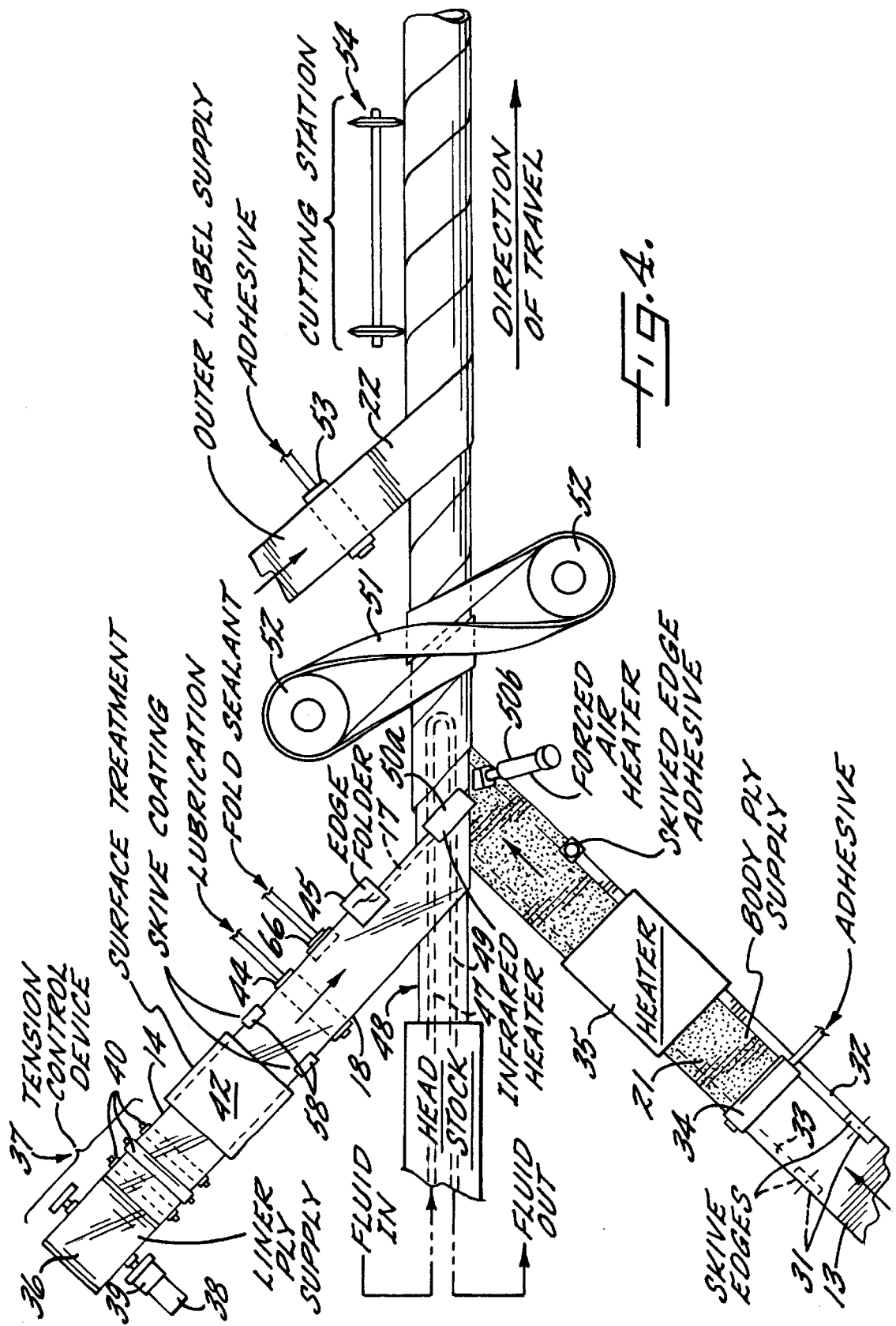
FIG. 4 is a schematic view of an apparatus in accordance with one preferred embodiment of the invention for making tubular composite containers with unsupported polymer film liners.

An apparatus for making tubular containers in accordance with the present invention is illustrated in FIG. 4. A continuous strip of paperboard body ply material 13 is supplied to the apparatus and is first passed through a pair of opposed edge skivers 31. The edge skivers remove part of the square edge of the body ply 13 to create first 32 and second 33 edges having a beveled configuration.

The body ply 13 is then advanced through an adhesive applicator 34, which applies an adhesive 21 to the upper surface of the body ply. The adhesive 21 is advantageously an aqueous adhesive that overcomes the many problems associated with solvent based adhesives. No special equipment is needed to capture solvents that evaporate from the adhesive in order to comply with environmental regulations. One preferred adhesive is No. 72-4172, which is available from the National Starch and Chemical Company. Another adhesive that may be used is No. 33-4060, which is also available from the National Starch and Chemical Company.

The body ply 13 and wet adhesive 21 applied thereto are then passed underneath a heater 35 that evaporates at least part of the water content of the aqueous adhesive 21 to render the adhesive substantially tacky. It is important that the correct amount of heat is supplied to the adhesive. Insufficient heat will not evaporate enough water in a sufficiently short period of time with the result that the adhesive will not be rendered sufficiently tacky. Conversely, too much heat will overdry the adhesive and cause the adhesive to lose tackiness. It has been discovered that at least about 100,000 J/m2 is an appropriate amount of heat to render the wet adhesive tacky. More particularly, heating the adhesive with at least about 460,000 J/m2 is preferred. It has been determined that, if the body ply 13 is moving at a speed of about 50 feet per minute (or is heated for less than about 3 seconds), heating the adhesive 21 with a heater 35 having a heat flux of 200,000 W/m2 will raise the temperature of the paperboard body ply 13 to at least the boiling point of water (212° F. at sea level), and as high as 320° F. It will be understood by one of ordinary skill in the art, however, that these parameters may change depending on various factors including the thickness of the adhesive layer 21, the efficiency of the heat source, the speed of the body ply (line speeds up to about 400 ft./min. are contemplated) and the type of adhesive used. Accordingly, a sufficient amount of heat is that which causes the adhesive to become tacky in a short period of time without being overdried. A preferred type of heat source is an infrared heater although various other heat sources, e.g., forced air heating or the like, can be used.

Figure 3:
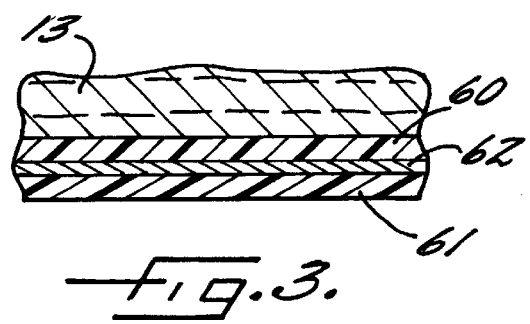
FIG. 3 is a schematic cross-sectional view taken on line 3—3 of FIG. 2, showing the multi-layered construction of the polymer film liner in accordance with one preferred embodiment of the invention.

A preferred liner construction is illustrated in FIG. 3 and includes a heat seal layer 60 and a barrier layer 61. The barrier layer 61 forms the inner surface of the liner that faces the interior of the container and also contacts the mandrel when the liner is wrapped onto the mandrel, as described below. Accordingly, the barrier layer 61 preferably comprises a relatively hard polymer, i.e., a polymer having a relatively high melting point relative to the temperature at which the heat seal layer is activated. The barrier layer 61 is preferably resistant to the passage of liquids and/or gases such as oxygen. If a barrier is required for both liquids and preferably also gases, a preferred barrier material is metallized polyester. For example, metallized polyethylene terphthalate (PET) provides a good barrier against the passage of liquids and gases and has a relatively high melting point of about 350° F. Some food products, however, do not require a gas barrier, such as various juices, and other barrier materials may be used (although the barrier may also be generally resistant to the passage of gases). It will be understood that various barrier materials or properties could be employed depending upon the item being packaged.

Alternative hard barrier films include metallized OPP, metallized oriented HDPE, metallized nylon, and the like as will be apparent to the skilled artisan. One surface of the barrier layer 61 may include a thin metallized coating 62 to provide a metallic appearance and also to enhance the barrier properties. The metallized coating 62, which may be formed of aluminum, is significantly thinner than a foil layer, however, and is not necessary for strength or barrier properties in certain applications. Thus, a thick and expensive foil layer is advantageously eliminated. The barrier may include a silicon dioxide coating. The liner ply 14 preferably has a total thickness less than about 2 mils and is more preferably closer to 1 mil or less in thickness.

The heat seal layer 60 comprises a heat-sealable material that softens and readily adheres to itself when raised to its sealing temperature. Examples of suitable heat-sealable materials include but are not limited to polyesters, ethylene vinyl acetate copolymer (EVAC), ethylene methyl acrylate, and blends thereof.

With reference again to FIG. 4, the liner 14 is advanced from a liner supply roll 36 through a tension control device 37 on its way to being wrapped about the mandrel 47. Various types of devices may be used for controlling the liner tension. As shown, the tension control device 37 includes a motor 38 and a brake 39 for respectively assisting and resisting rotation of the liner supply roll 36, and a web accumulator comprising a plurality of rollers 40 spaced apart vertically such that the liner 14 is wound in serpentine fashion around the rollers 40. At least one of the rollers 40 is vertically movable relative to the other rollers 40 such that the length of the web accumulated in the web accumulator can be varied. A sensor (not shown) senses the length of web accumulated in the accumulator, and based on the signal from the sensor the motor 38 is operated or the brake 39 is applied to maintain the length of accumulated web within predetermined limits. However, regardless of the specific device chosen for controlling liner tension, advantageously the tension control device 37 is capable of maintaining the liner tension less than about 1 pound per inch of width of the liner 14, and more preferably less than about 0.5 pound per inch of width. For instance, for a liner 14 having a width of 7 inches, the tension control device 37 preferably should maintain the liner tension at about 2–3 pounds.

After the tension control device 37, the liner 14 passes through a surface treatment unit 42 that treats the outer surface of the liner 14 (i.e., the surface that will face outward away from the mandrel 47 and be adhered to the paperboard body strip 13) to improve wetting and adhesion of adhesive thereto. The surface treatment unit in a preferred embodiment of the invention comprises a corona discharge unit. However, other devices such as flame treatment devices may be used instead. After passing through the surface treatment unit 42, the liner 14 passes through an optional lubrication device 44, which applies a lubricant to the inner surface of the liner 14 (i.e., the surface that contacts the mandrel 47), except for the edge portion that is to be heat sealed, for aiding in movement of the liner 14 along the mandrel 47. In some applications, the lubricant may not be needed and thus the lubrication device 44 can be omitted.

After passing through the lubricating device 44, the liner 14 passes through an edge folder 45, which folds the downstream edge portion 17 of the liner strip inward so that the folded edge portion 17 faces the mandrel 47. The liner strip is then helically wrapped about the mandrel 47 such that the folded edge portion 17 overlaps an opposite (upstream) edge portion 18 of a previously wrapped helical turn of the liner 14 to form an overlap joint 16 (FIG. 2) therebetween. The overlap joint 16 is sealed by heating the liner 14 to raise the temperature of the liner 14 to at least the sealing temperature of the heat seal layer 60.

One advantageous feature of the construction of the liner strip 14 including the heat seal layer 60 and hard polymer barrier layer 61 is that the barrier layer 61 has a substantially higher melting temperature than the heat seal layer 60. As noted above, the first edge portion 17 of the liner ply 14 is raised to a temperature such that the heat seal layer 60 is activated. However, if the barrier layer 61 were made of the same polymer as the heat seal layer 60 or had a melting temperature equal to or less than the sealing temperature of the heat seal layer 60, the barrier layer 61 would be melted and inclined to stick to the mandrel 47, which would greatly impede the winding process.

Because the liner 14 is very thin, it has very little capacity to retain heat. Accordingly, heating the liner 14 prior to the liner 14 being wrapped onto the mandrel 47 would be inefficient and difficult to accomplish in view of the rapid cooling that would take place subsequent to the heating device and prior to the liner being wrapped about the mandrel. Accordingly, the heating of the liner 14 in accordance with a preferred embodiment of the present invention is performed in a two-stage process while the liner 14 is on the mandrel 47 such that the mandrel acts as a heat sink for efficiently heating the liner overlap joint. More particularly, a portion 48 of the mandrel has a fluid passage 49 through which a heated fluid is circulated to elevate the temperature of the portion 48 to a temperature that is below the sealing temperature of the heat seal layer 60 of the liner. For instance, where the sealing temperature of the heat seal layer 60 is about 180–220 degrees F, the heated portion 48 of the mandrel is heated to about 130–170 degrees F (i.e., about 50 degrees F below the sealing temperature of the heat seal layer). The liner 14 passes over the heated mandrel portion 48 as it is wrapped about the mandrel and thus is pre-heated to a temperature essentially equal to that of the mandrel portion 48. The overlapping edge portions 17 and 18 of the liner 14 are then further heated to at least the sealing temperature of the heat seal layer 60 by a pair of local heaters, specifically an infrared heater 50*a* and a forced-air heater 50*b*, which direct heat locally at the overlap joint 48 of the liner. The infrared heater 50*a* directs infrared radiation at the overlap joint 48. The infrared radiation penetrates through the overlapping edge portions 17 and 18 of the liner and locally heats a portion of the surface of the mandrel 47 underlying the edge portions 17, 18 to a temperature at least as great as, and preferably higher than, the sealing temperature of the heat seal layer 60. The infrared heater 50*a* and/or the forced-air heater 50*b* may be elongated in the helical direction.

After the liner edges have been sealed together to form a polymer film tube on the mandrel 47, the paperboard strip 13 (or multiple plies of paperboard in the case of a multi-ply body wall) is wrapped onto the liner 14 and adhered thereto by the adhesive 21 on the paperboard strip 13. The tube is then advanced down the mandrel 47 by a tube conveyor such as winding belt 51 wrapped around a pair of opposed pulleys 52. The winding belt 51 not only rotates and advances the tube, but also applies pressure to the overlapping edges of the body ply 13 and liner ply 14 to ensure a secure bond between the respective ply edges.

An outer label ply 22 is then preferably passed over an adhesive applicator 53 and wrapped around the body ply 13. The label ply 22 could be applied before the winding belt 51. At a cutting station 54, the continuous tube is cut into discrete lengths and removed from the mandrel 47.

Figure 5:
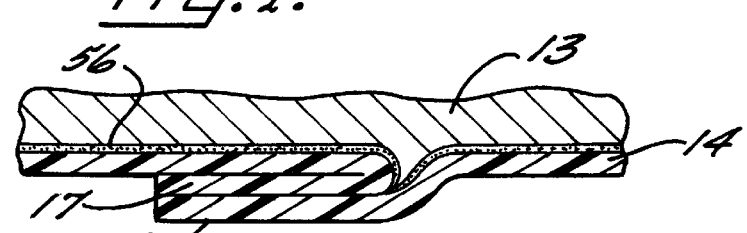
FIG. 5 is a cross-sectional view taken through an overlap joint of a container in accordance with another embodiment of the invention, in which an adhesion-promoting coating covers the surface of the liner facing the body ply.

With reference to FIG. 5, an alternative preferred embodiment of the invention is depicted in which the liner strip 14 includes an adhesion-promoting coating 56 covering the outer surface of the liner strip facing the body ply 13. For example, the coating 56 advantageously can be ethylene methyl acrylate (EMA), an ethylene vinyl acetate copolymer (EVAC), or a coextruded coating comprising a layer of ethylene acrylic acid (EAA) and a layer of ethylene methyl acrylate. The EMA or EVAC layer is readily adhered to the wet adhesive 21 and thus provides a good bond between the liner 14 and the body ply 13.

However, it is unnecessary to have the coating 56 on the edge portions 17 and 18 of the liner strip 14, and thus, the coating 56 preferably terminates adjacent the edge portions, as shown in FIG. 5. Where the liner strip 14 is supplied with the coating 56 applied to the entire outer surface of the liner strip (such as a strip formed by coextruding the coating, heat seal layer, and barrier layer), it is desirable to remove the coating 56 from the edge portions so that the heat seal layer (e.g., heat seal layer 60 shown in FIG. 3) is exposed on the edge portions. In that event, as shown in FIG. 4, the apparatus for making containers preferably includes edge skivers 58 for skiving off the coating 56 along the edge portions 17 and 18.

Figure 6:
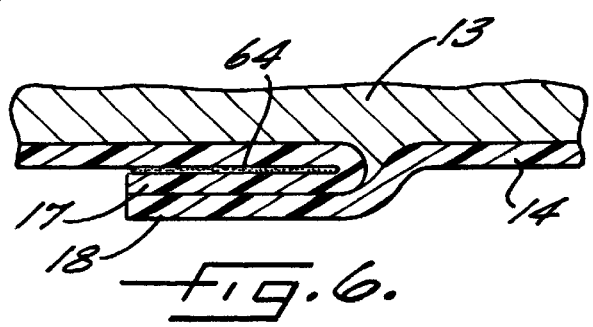
FIG. 6 is a view similar to FIG. 5, showing yet another embodiment of the invention, in which a sealant is applied between the folded edge portion of the liner strip and the remainder of the liner strip.

With reference to FIG. 6, it is desirable to seal the folded edge portion 17 to the inner surface of the remainder of the liner strip 14 with a sealant 64 such as a liquid adhesive or a hot melt adhesive that is heat-activated. For example, hot melt adhesives designated 72-4781, 72-4667, 34-2734, or 34-2791 available from National Starch Company can be used. Accordingly, the apparatus can include a fold sealant applicator 66 for applying a sealant to the inner surface of the edge portion 17 of the liner strip 14.

An advantageous characteristic of a container such as the container 10 formed in accordance with the present invention is that, by virtue of wrapping the liner 14 onto the mandrel without first laminating it to the body ply 13, the liner 14 can be made to be relaxed (i.e., not in substantial circumferential tension or compression) and to lie flat against the adjacent body ply 13, as described in the aforementioned '900 patent application.

Once the containers 10 have been formed, the ends of the containers 10 are rolled outwardly to form the bead 15 or a flange. Another advantageous feature of the polymeric liner ply according to the present invention is that the elasticity of the polymer allows the liner to stretch and more easily roll into a bead 15, and consequently the bead is less likely to unroll after its formation. Conventional inelastic foil liners have very high tensile strength and thus can have a tendency to split during the beading process, and also may have a tendency to unroll the bead 15, which can present a problem when sealing the ends.

After being filled with the food product, a membrane seal 11 preferably is sealed on one or both ends of the container 10. An end cap 12 can then be placed over the seal 11. The unsupported liner ply 14 according to the present invention is significantly thinner than conventional supported liners and thus the fold seam is substantially thinner than an anaconda fold seam of a conventional supported liner. Accordingly, much smaller discontinuities are presented at the point where the seam crosses the bead. Thus, the membrane seal 11 can be cheaply and easily sealed to the bead 15 with a minimum amount of adhesive sealant, and the fit and removability of the overcap can be improved.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products where the liner ply is advantageous such as, for example, ink or caulk. Although specific terms are employed herein, they are used in a generic and descriptive sense only and not for purposes of limitation.

What is claimed is:

1. A multi-ply tubular container comprising:

at least one body ply formed of paperboard and wrapped into a tubular shape having an inner surface; and a polymeric liner ply wrapped to form a tubular liner and having an outer surface of the tubular liner adhered to the inner surface of the body ply, the tubular liner including at least one fold seal extending generally lengthwise along the container, the fold seal being formed by a first edge portion of the liner ply that is folded inward toward the interior of the container and an opposite second edge portion of the liner ply that overlaps the folded first edge portion and is sealed thereto.

2. The container of claim 1, wherein the liner ply includes a heat seal layer covering at least portions of the liner ply adjacent to the edges thereof, the heat seal layer facing the body ply and being formed of a heat-sealable material having a sealing temperature at which the heat-sealable material softens and seals to itself, and wherein the liner ply includes a hard polymer layer that forms the inner surface of the container and is formed of a polymer material having a melting temperature substantially higher than the sealing temperature of the heat seal layer.

3. The container of claim 2, wherein the hard polymer layer of the liner ply comprises a barrier material that is substantially impervious to moisture and gases.

4. The container of claim 3, wherein the barrier material comprises metallized polyester.

5. The container of claim 3, wherein the barrier material comprises polyethylene teraphthalate.

6. The container of claim 2, wherein the heat seal layer comprises polyester.

7. The container of claim 2, wherein the heat seal layer comprises a blend of polyethylene and an ethylene vinyl acid copolymer.

8. The container of claim 2, wherein the liner strip further comprises a coating of an adhesion-promoting material applied to the surface of the heat seal layer facing the body ply for promoting adhesion of the liner ply to the body ply.

9. The container of claim 8, wherein the adhesion-promoting coating terminates adjacent the edge portions of the liner strip such that the heat seal layer is exposed on the edge portions.

* * * * *